United States Patent
Kim

(10) Patent No.: US 6,853,415 B2
(45) Date of Patent: Feb. 8, 2005

(54) LIQUID CRYSTAL DISPLAY

(75) Inventor: Chul Ha Kim, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 19 days.

(21) Appl. No.: 10/633,431

(22) Filed: Aug. 1, 2003

(65) Prior Publication Data

US 2004/0189894 A1 Sep. 30, 2004

(30) Foreign Application Priority Data

Mar. 27, 2003 (KR) ................................ 10-2003-0019170

(51) Int. Cl.⁷ .......................................... G02F 1/1335
(52) U.S. Cl. ....................................................... 349/96
(58) Field of Search ............................................ 349/96

(56) References Cited

U.S. PATENT DOCUMENTS 6,587,168 B2 * 7/2003 Jones et al. .................... 349/96

* cited by examiner

Primary Examiner—Kenneth Parker
Assistant Examiner—Thanh-Nhan P Nguyen
(74) Attorney, Agent, or Firm—Ladas & Parry LLP

(57) ABSTRACT

An LCD comprises: an upper array substrate and a lower color filter substrate, which are opposed and spaced a predetermined distance to each other; a reflective film formed in a matrix on a non-pixel section on the color filter substrate; a black-matrix formed on the reflective film; red, green, and blue color filters, formed on pixel sections of the color filter substrate defined by the black-matrix; a lower orientation film formed on the whole area of substrates including the color filters and black-matrix; a pixel electrode formed on the pixel section on the array substrate; an upper orientation film formed on the whole area of substrates including the pixel electrode; a liquid crystal layer interposed between the color filter substrate and the array substrate; a partially masked lower polarizer mounted outside the color filter substrate, in which a portion under the non-pixel section does not have polarization function; and an upper polarizer mounted outside the array substrate. In the LCD, light absorbed in black-matrix is utilized by positioning the color filter substrate at a lower portion thereof and mounting the reflective film under black-matrix. The partially masked polarizer is used as the lower polarizer so as to minimize optical loss by black-matrix and polarizer, thus improving optical efficiency.

4 Claims, 2 Drawing Sheets

LIQUID CRYSTAL DISPLAY

BACKGROUND OF THE INVENTION

1. Field of the Invention

The present invention relates to a liquid crystal display, and more particularly to a liquid crystal display with improved optical efficiency.

2. Description of the Prior Art

As generally known in the art, a liquid crystal display (LCD) has been developed to replace a cathode ray tube (CRT) based on having merits in that it is lighter, thinner, shorter and smaller than CRT, in that it is driven at low voltage, and in that it consumes low electric power. Particularly, since a thin film transistor LCD (TFT LCD) has realized superior video quality, scale-up, coloring and so forth matchable for those of CRT, recently, it has been widely used in various areas as well as the notebook PC market and the monitor market.

Such LCDs, especially, TFT LCDs, comprise an array substrate having a TFT and a pixel electrode, and a color filter substrate coupled with the array substrate and having a color filter and a counter electrode, a liquid crystal layer being interposed between the array substrate and the color filter substrate. Further, orientation films for initial alignment of liquid crystal are mounted between the array substrate and the liquid crystal layer and between the color filter substrate and the liquid crystal layer. Still further, polarizers are attached to the outer sides of the respective substrates.

An LCD is a light-receiving display device which displays an image by means of light from an external source. Herein, a backlight is commonly used as an outer light source, which is mounted under the array substrate including the polarizers.

An LCD having a construction like the above displays certain picture image by operating liquid crystals of a pixel section between the array substrate and the color filter substrate with signaling through signal lines arranged in a matrix display.

Then, the LCD described above has a drawback in that the optical efficiency thereof is low. That is to say, LCDs have below 10% of substantially low optical efficiency because above 50% of optical loss occurs in the polarizer, partial optical loss also occurs in the color filters of red, green and blue, and the optical utilization rate is about 50% relative to the aperture ratio of pixels.

Herein, the aperture ratio in LCD is determined by the black-matrix formed on the color filter substrate. This black-matrix is formed so as to shut out light incident on a non-pixel section. Incident light on the black-matrix is completely absorbed into the black-matrix, so that the black-matrix causes optical loss.

FIG. 1 is a plan view of a color filter substrate, on which a black-matrix is formed, for explaining an LCD according to the prior art. FIG. 2 is a sectional view of an LCD according to the prior art.

Hereinafter, optical loss by the black-matrix and polarizer is now described with reference to FIGS. 1 and 2.

As shown in FIG. 1, the color filter substrate comprises a pixel section, in which color filters 13a, 13b and 13c of red, green and blue are formed, and a non-pixel section that is a boundary between the pixel sections on which the black-matrix 12 is formed.

In the above construction, light incident on a region in which the color filters 13a, 13b and 13c of red, green and blue are formed is utilized so as to display picture image, but light incident on the other region on which the black-matrix 12 is formed is completely absorbed, thus causing optical loss.

As shown in FIG. 2, LCD comprises an array substrate 1 having a pixel electrode 2, a color filter substrate 11 coupled with the array substrate and having color filters 13a, 13b and 13c and the black-matrix 12, and a liquid crystal layer 20 interposed between the array substrate and the color filter substrate. Further, orientation films 4 and 14 for initial alignment of liquid crystal are mounted between the array substrate 1 and the liquid crystal layer 20 and between the color filter substrate 11 and the liquid crystal layer 20. Still further, polarizers 5 and 15 are attached to the outer sides of the respective substrates 1 and 11. Reference numeral 22 unexplained indicates a spacer inserted so as to maintain a distance between the substrates.

In an LCD constructed as above, light from a backlight (not shown in the drawings) is introduced to the inside a panel through a lower polarizer 5, wherein about 50% of optical loss occurs in course of polarization from unpolarized light to linearly polarized light.

Further, light traveling along an optical path A among the light incident inside the panel is utilized so as to display an image, but light traveling along an optical path B is completely absorbed in the black-matrix 12, so that the black-matrix causes optical loss.

In conclusion, in a conventional LCD as described above, the polarizer and the black-matrix cause considerable optical loss, so that the conventional LCD has very low optical efficiency.

SUMMARY OF THE INVENTION

Accordingly, the present invention has been made to solve the above-mentioned problems occurring in the prior art, and an object of the present invention is to provide an LCD, in which optical loss by black-matrix and polarizer is restricted.

It is another object of the present invention to provide an LCD, in which optical loss by black-matrix and polarizer is restricted so that optical efficiency is improved.

In order to accomplish these objects, there is provided an LCD comprising: an upper array substrate and a lower color filter substrate, which are opposed and spaced a predetermined distance to each other; a reflective film formed in a matrix on a non-pixel section on the color filter substrate; a black-matrix formed on the reflective film; red, green, and blue color filters, formed on pixel sections of the color filter substrate defined by the black-matrix; a lower orientation film formed on the whole area of substrates including the color filters and black-matrix; a pixel electrode formed on the pixel section on the array substrate; an upper orientation film formed on the whole area of substrates including the pixel electrode; a liquid crystal layer interposed between the color filter substrate and the array substrate; a partially masked lower polarizer mounted outside the color filter substrate, in which a portion under the non-pixel section does not have polarization function; and an upper polarizer mounted outside the array substrate.

Herein, the lower polarizer is designed in such a manner that an overlapped length d of a portion having polarization function with the reflective film ranges relative to a width L of the reflective film in accordance with the following expression 1 in order to prevent a light leakage;

$$0 < d < L/2.$$
[expression 1]

In accordance with another aspect of the present invention, there is provided an LCD comprising: an upper array substrate and a lower color filter substrate, which are opposed and spaced a predetermined distance to each other; a reflective film formed in a matrix on a non-pixel section on the color filter substrate; a black-matrix formed on the reflective film; color filters of red, green and blue formed on pixel sections of the color filter substrate defined by the black-matrix; a lower polarizer formed on the whole area of substrates including the color filters and black-matrix; a lower orientation film formed on the lower polarizer; a pixel electrode formed on the pixel section on the array substrate; an upper orientation film formed on the whole area of substrates including the pixel electrode; a liquid crystal layer interposed between the color filter substrate and the array substrate; and an upper polarizer mounted outside the array substrate.

Herein, the lower polarizer is a partially masked polarizer, in which a portion on the black-matrix does not have a polarization function.

According to the present invention, the reflective film is mounted under a black-matrix while the color filter substrate is mounted at lower portion of LCD, so that light absorbed in the black-matrix may be utilized. Also, since the lower polarizer is used as a partially masked polarizer, optical loss by the black-matrix and the polarizer can be minimized, which improve optical efficiency.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
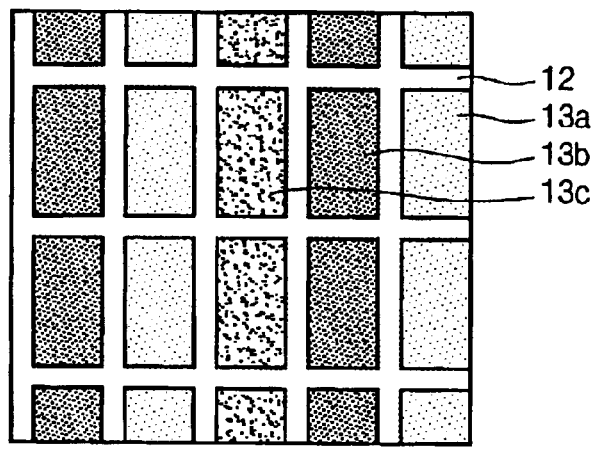
FIG. 1 is a plan view of a color filter substrate in which black-matrix is formed, which intends to describe an LCD of the prior art.
Figure 2:
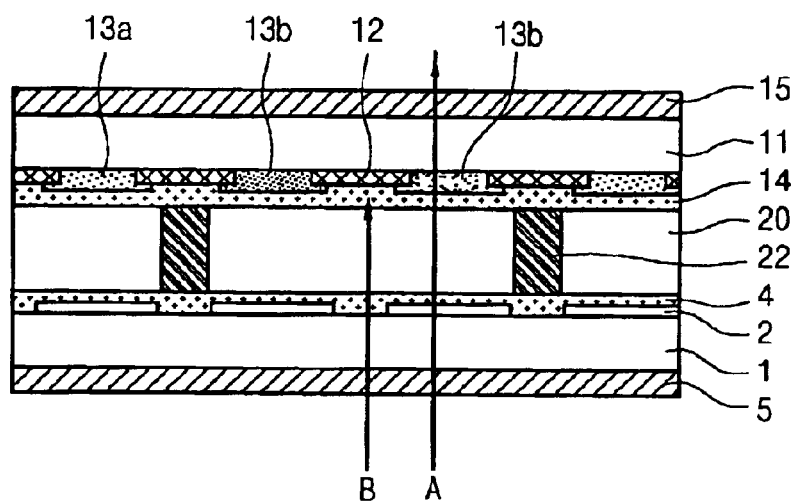
FIG. 2 is a sectional view of an LCD of the prior art.
Figure 3:
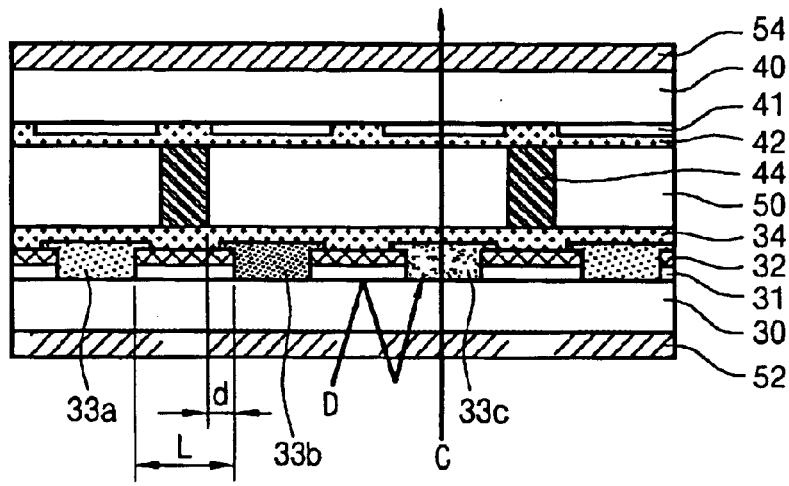
FIG. 3 is a sectional view of an LCD according to an embodiment of the present invention.

FIG. 3 is a sectional view of an LCD according to an embodiment of the present invention;

As shown in FIG. 3, LCD according to an embodiment of the present invention has a construction that a color filter substrate 30 is placed under LCD adjacent to a light source, a backlight (not shown in the drawings), whereas an array substrate 40 is placed on the color filter substrate 30.

On the color filter substrate 30, a high-reflectivity reflective film 31 is formed in matrix on a non-pixel section that is a boundary between the pixel sections. A black-matrix 32 is formed on which the reflective film 31. Also, color filters 33a, 33b and 33c of red, green and blue are formed on the respective pixel sections defined by black-matrix 32. A lower orientation film 34 is formed on the whole area of the substrate including black-matrix 32 and color filters 33a, 33b and 33c.

On the array substrate 40, a pixel electrode 41 is formed on the respective pixel sections opposite to the color filter 33a, 33b and 33c of the color filter substrate 30. An upper orientation film 42 is formed on the whole area of the substrates including the pixel electrode 41.

The color filter substrate 30 and array substrate 40 are coupled each other while a liquid crystal layer 50 is interposed therebetween, wherein a spacer 44 is placed between the substrates 30 and 40 so as to maintain a space therebetween. Also, polarizers 52 and 54 are attached outside the substrates 30 and 40, wherein the lower polarizer 52 attached to the color filter substrate 30 is used as a partially masked polarizer that is not a common polarizer.

That is to say, the lower polarizer 52 is formed in the same shape as black-matrix 32 so that a portion under black-matrix has no polarization function and only a portion under the color filter 33a, 33b and 33c has polarization function.

Herein, in designing the partially masked lower polarizer 52, it is preferably designed so that an overlapped length d of a portion having polarization function with the reflective film ranges in accordance with the following expression in order to prevent a light leakage. In expression 1, L indicates a width of the reflective film 31.

$$0 < d < L/2 \qquad \text{[expression 1]}$$

LCD of the present invention as described above has improved optical efficiency as follows.

Reference numerals C and D indicate optical paths traveling along pixel section and non-pixel section, respectively. First, light traveling along optical path of C is utilized so as to display picture image through the color filter 33c of the pixel section.

However, light traveling along optical path of D travels through the lower polarizer 52, but it is reflected against the reflective film 31 and is introduced into the backlight (not shown). Then, although it is not shown and described in detail, it is utilized again so as to travel along the panel while being reflected by a reflective plate of the backlight.

Accordingly, light from the backlight is not absorbed in black-matrix but travels only along the pixel sections and is utilized again through reflection against the reflective film, so that optical loss by black-matrix cannot occur.

Also, in case where common polarizer is used, light traveling to the non-pixel section firstly loses by the polarizer. However, in case where the partially masked polarizer 52 of the present invention is used, although optical loss by the polarizer for light traveling from the backlight to the pixel sections occurs, it may be considered that optical loss for light traveling to the non-pixel section is not caused because a portion of the polarizer under the non-pixel section does not have polarization function.

Accordingly, optical loss is caused only for light traveling to the pixel section and optical loss for light traveling to the non-pixel section is removed, thus reducing optical loss.

Finally, LCD of the present invention has improved optical efficiency because optical loss by black-matrix is not caused and optical loss by polarizer is minimized.

Figure 4:
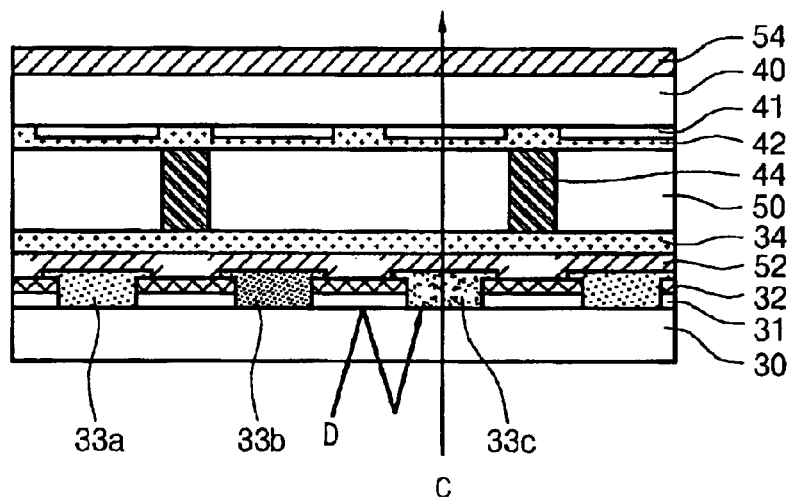
FIG. 4 is a sectional view of an LCD according to another embodiment of the present invention.

FIG. 4 is a sectional view of an LCD according to another embodiment of the present invention.

As shown in FIG. 4, an LCD according to another embodiment of the present invention has the same construction as that of the former embodiment of the present invention, except that the partially masked lower polarizer 52 is not mounted outside the color filter substrate 30 but is mounted on the substrate on which black-matrix 32 and color filters 33a, 33b and 33c are formed, and that the lower orientation film 34 is formed on the lower polarizer 52.

In the LCD according to the present embodiment, the partially masked lower polarizer 52 is mounted not outside but inside the color filter substrate 30, so that it can be expected that optical loss by polarizer 52 is further reduced as compared with the former embodiment while optical loss by black-matrix 32 is removed.

Meanwhile, in the above-mentioned embodiment, although the partially masked polarizer is used as the lower polarizer mounted inside the color filter substrate, commonly used polarizer can be used in light of functional aspect.

Also, an LCD according to some embodiments described above comprises a lower color filter substrate, an upper array substrate, the reflective film on color filter substrate, and the partially masked polarizer as the polarizer to be positioned on the color filter substrate in order to improve optical efficiency. In contrast, in an LCD according to another embodiment of the present invention, the array substrate is placed under the LCD, the color filter substrate is placed on the LCD as the construction of a typical LCD, and the partially masked polarizer is only attached under the array substrate, in order to improve optical efficiency.

In this case, although a problem of optical loss by black-matrix cannot be resolved, optical loss by polarizer substantially corresponding to majority of total optical loss can be removed, so that it is expected that optical efficiency may be considerably increased.

According to the present invention as described above, the color filter substrate is placed under the LCD, the array substrate is placed on the LCD, especially, the reflective film is mounted under the black-matrix, and the masked polarizer that has not polarization function partially is used instead of common polarizer, which removes optical losses by black-matrix and polarizer, thus improving optical efficiency.

Also, the present invention increases optical efficiency to improve luminance of the LCD, so that members such as Cholesteric Liquid Crystal (CLC) polarizers for improvement of luminance and the prism sheet can be removed, thus reducing manufacturing cost of the LCD.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An LCD comprising:
    an upper array substrate and a lower color filter substrate, which are opposed and spaced a predetermined distance to each other;
    a reflective film formed in a matrix on a non-pixel section on the color filter substrate;
    a black-matrix formed on the reflective film;
    red, green, and blue color filters, formed on pixel sections of the color filter substrate defined by the black-matrix;
    a lower orientation film formed on the whole area of substrates including the color filters and black-matrix;
    a pixel electrode formed on the pixel section on the array substrate;
    an upper orientation film formed on the whole area of substrates including the pixel electrode;
    a liquid crystal layer interposed between the color filter substrate and the array substrate;
    a partially masked lower polarizer mounted outside the color filter substrate, in which a portion under the non-pixel section does not have polarization function; and
    an upper polarizer mounted outside the array substrate.

2. An LCD as claimed in claim 1, wherein the lower polarizer is designed in such a manner that an overlapped length d of a portion having polarization function with the reflective film ranges relative to a width L of the reflective film in accordance with the following expression 1 in order to prevent a light leakage;

$$0<d<L/2. \qquad \text{[expression 1]}$$

3. An LCD, comprising:
    an upper array substrate and a lower color filter substrate, which are opposed and spaced a predetermined distance to each other;
    a reflective film formed in a matrix on a non-pixel section on the color filter substrate;
    a black-matrix formed on the reflective film;
    color filters of red, green and blue formed on pixel sections of the color filter substrate defined by the black-matrix;
    a lower polarizer formed on the whole area of substrates including the color filters and black-matrix;
    a lower orientation film formed on the lower polarizer;
    a pixel electrode formed on the pixel section on the array substrate;
    an upper orientation film formed on the whole area of substrates including the pixel electrode;
    a liquid crystal layer interposed between the color filter substrate and the array substrate; and
    an upper polarizer mounted outside the array substrate.

4. An LCD as claimed in claim 3, wherein the lower polarizer is a partially masked polarizer, in which a portion on the black-matrix does not have a polarization function.

* * * * *